United States Patent [19]

Castle

[11] 4,264,940
[45] Apr. 28, 1981

[54] SHIELDED CONDUCTOR CABLE SYSTEM

[76] Inventor: Kent D. Castle, 1902 Savanna Ct., N., League City, Tex. 77573

[21] Appl. No.: 746,579

[22] Filed: Nov. 30, 1976

[51] Int. Cl.³ .............................................. H02H 9/04
[52] U.S. Cl. ................................... 361/91; 179/78 A; 333/12; 361/56
[58] Field of Search ............... 179/78 A; 361/56, 90, 361/91, 110, 111; 333/12

[56] References Cited

U.S. PATENT DOCUMENTS

| | | | |
|---|---|---|---|
| 2,243,851 | 6/1941 | Booth et al. | 333/12 X |
| 3,308,309 | 3/1967 | Wichmann | 333/12 X |
| 3,719,904 | 3/1973 | Bragg | 333/12 |
| 3,760,298 | 9/1973 | Pell | 333/12 |
| 3,771,022 | 11/1973 | Isokawa | 361/56 |

FOREIGN PATENT DOCUMENTS 433381  8/1935  United Kingdom .................. 179/78 A Primary Examiner—Patrick R. Salce

[57] ABSTRACT

The cable system carries one or more insulated conductors completely enclosed within a shield having one end connected to ground. A lightning-protector network connects the other end of the shield to ground. The protector network is normally open circuited and becomes only short circuited in response to a momentary abnormal surge voltage induced in the shield. The protector network's open-to-short impedance change completes a conductive circuit path between the shield and the two grounded ends for conducting a shield current which has the desired effect of protecting the signal-carrying conductors in the cable from the large-surge voltage.

2 Claims, 4 Drawing Figures

SHIELDED CONDUCTOR CABLE SYSTEM

BACKGROUND OF THE INVENTION (a) Field of the Invention

The invention relates to circuit protection from abnormal surge voltages induced in a shielded cable.

(b) Description of the Prior Art

Various techniques are known for protecting the signal-carrying conductors from noise-induced electrostatic interference, and from lightning-induced electromagnetic interference.

To provide protection to signal wires within the cable from both electrostatic and electromagnetic interferences, the known prior art required two separate, concentric shields, insulated from each other. The outer shield was grounded at both of its end for lightning-induced (electromagnetic), high-voltage interference protection, and the inner shield was grounded only at one end for noise-induced (electrostatic), low-voltage interference protection.

While such a two-shield cable does provide the desired double protection, it can be objectionable in industries wherein weight is a critical factor, as in weight-critical spacecraft or aircraft wiring systems.

Due to critical weight restrictions, some crafts use cables with one-shield grounded only at one end. In such cases, the signal-carrying wires within the cable are susceptible to lightning-induced, relatively-large, wire-to-ground electromagnetic voltages, capable of damaging components within the electronic boxes inter-connected by the one-shield cable.

SUMMARY OF INVENTION

Instead of the normally-employed, two-shield cable for double protection electrostatic and electromagnetic, the present invention provides a cable system having one shield and a protector network, normally having a very-high impedance (open) to ground. The network switches to a very-low impedance (short) to ground when an abnormal surge voltage is induced in the shield.

In a preferred embodiment of the cable system, one end of the single shield is connected to ground and the other end of the shield is connected to ground through the protector network. When activated, for example, by a lightning-induced voltage in shield, the protector network's normally very-high impedance (open) to ground switches to a very-low impedance (short) to ground and thereby allows the lightning-induced surge voltage to drive cable shield current to ground thus generating a counter-magnetic flux within the cable. The counter-magnetic flux generated within the cable by the shield current is in opposition to the magnetic flux induced by the lightning, thereby cancelling the adverse effect of the latter and providing protection to signal-carrying wires from the high-voltage induced lightning surges. After the lightning, the protection network switches, and normal high-impedance (open) to ground is restored. Thereafter, signal wiring electrical noise protection from electrostatic coupling into the cable will be maintained by the single-grounded end of the shield, in the normal circuit configuration.

The protector network preferably comprises a pair of diodes connected back-to-back in parallel. Each diode normally has a high impedance to ground. Depending on the polarity of the lightning-induced voltage in the shield, one of the diodes will conduct, thereby closing the ground circuit for the lightning-induced shield current. Upon the collapse of the lightning-induced voltage in the cable shield, the diode-network's high impedance is re-established and, as before the lightning's induced voltage, the ground connection at one end of the shield will provide protection from electrostatic interference.

DETAILED DESCRIPTION OF THE PRIOR ART

Figure 1:
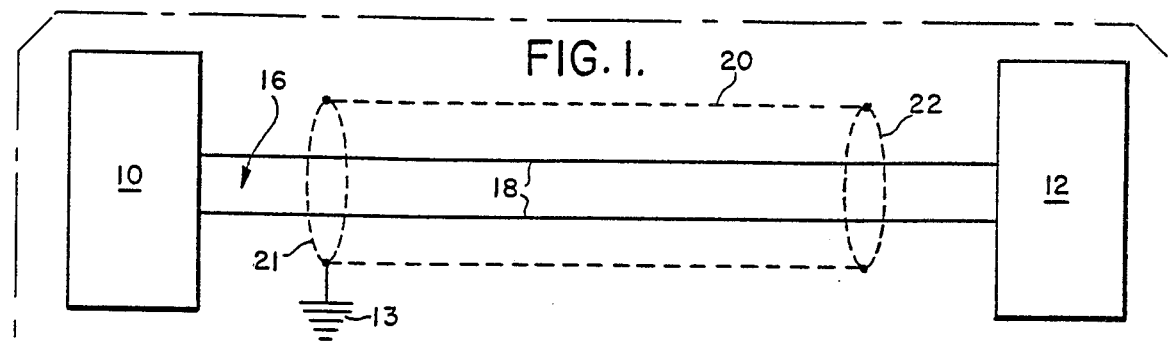
FIG. 1 shows a single-shielded cable grounded at one end only, in accordance with prior practice.

Throughout the drawings, the same reference characters will be used to designate the same or similar parts.

Figure 2:
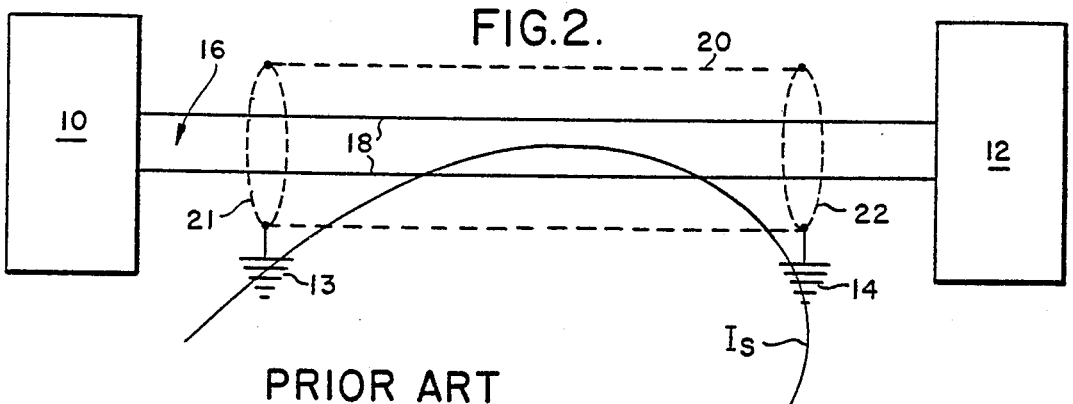
FIG. 2 is similar to FIG. 1 with both ends of the shield being grounded in accordance with prior practice.
Figure 3:
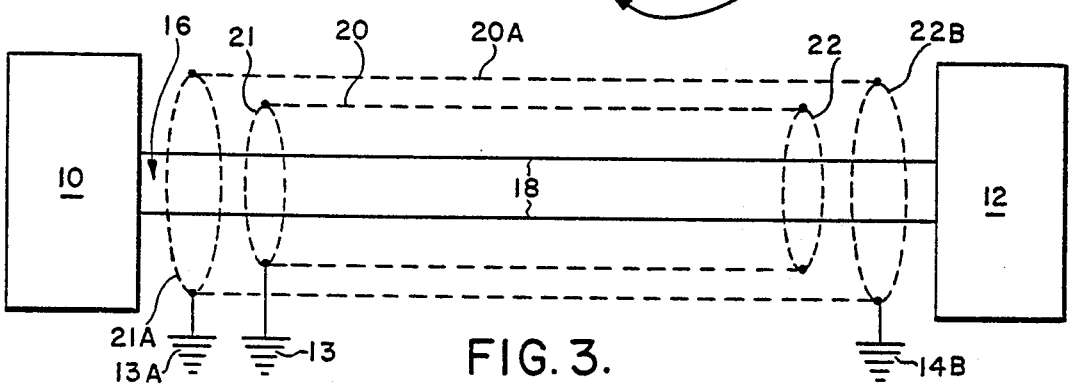
FIG. 3 shows a cable having two concentric shields, the inner shield being grounded at one end only, and the outer shield being grounded at both ends in accordance with prior practice.
Figure 4:
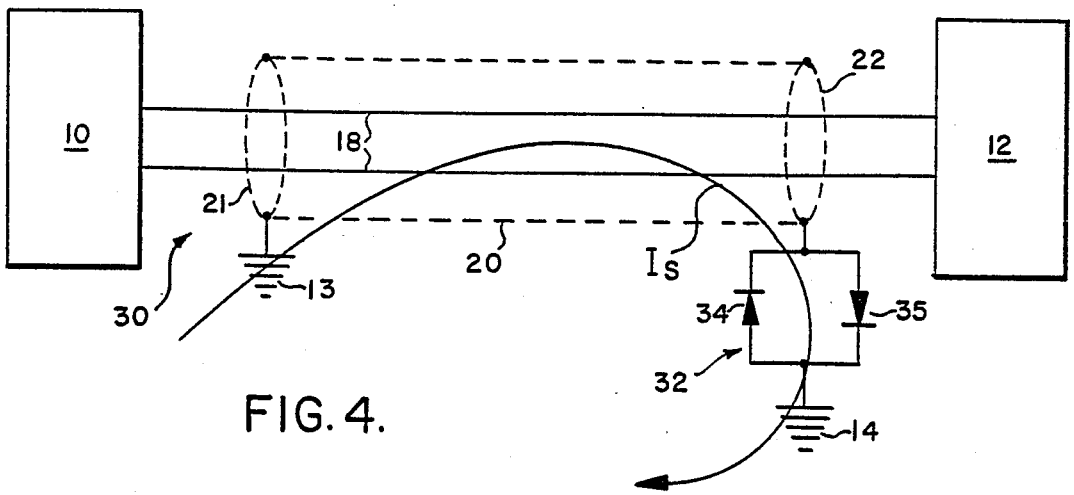
FIG. 4 shows a diagramatic representation of the cable system in accordance with the present invention.

FIGS. 1-3 illustrate prior art methods for shielding cables. Two spaced-apart boxes 10,12, carrying electronic systems, are interconnected by a cable 16 having one or more insulated conductors 18. Cable 16 is completely enclosed in a conducting envelope or shield 20. Only one end 21 of the shield is connected to ground at 13, thereby providing protection from electrostatic coupling or noise induced into the signal-carrying wires 18. The other end 22 of the shield is not connected to ground (FIG. 1).

But, when shield 20 receives a momentary abnormal surge voltage induced by lightning, wire-to-wire and wire-to-ground voltages can result that are capable of damaging the electronic components within boxes 10 and 12.

Protection only from lightning-induced voltages can be obtained by connecting the shield's end, 21 to ground at 13 and its end 22 to ground at 14, as shown in FIG. 2. A completed circuit path from the shield through both its grounded ends 21, 22 allows a current $I_s$ to flow through shield 20 which sets up a counter-magnetic flux within the shielded cable. This counter-magnetic flux will tend to cancel the magnetic flux induced by the lightning, thereby effectively protecting the signal-carrying wires 18.

Protection from both lightning-induced high voltages and from capacitatively-induced electrostatic noise can be obtained, in accordance with prior practice, by using a cable 16 with two concentric shields 20A and 20 insulated from each other, as shown in FIG. 3. The outer shield 20A has at both of its ends 21A, 22B connected to ground at 13A, 14B respectively, and the inner shield 20 has its end 21 connected to ground at 13.

Thus, the outer shield 20A will provide protection from lightning-induced voltages, and the inner shield 20 will provide protection from electrostatically-induced noise.

It will be apparent that cable 16 with two distinct shields adds undesired weight to weight-critical wiring, such as is used in spacecrafts and aircrafts.

DETAILED DESCRIPTION OF A PREFERRED EMBODIMENT OF THE INVENTION

In accordance with this invention, there is provided a shielded cable system 30 whose single shield 20 has its one end 21 connected to ground at 13 (as in FIG. 1) but its other end 22 is now connected to ground through a protector network, generally designated as 32. Network 32 normally provides a very-high impedance (open) to ground at 14 but changes to a very-low impedance (short) to ground when lightning induces a momentary surge voltage in shield 20.

Network 32, when activated by a lightning-induced voltage in the shield, will allow the flow of a shield current $I_s$ from the shield through the completed ground circuit at 13 and 14.

The flow of shield current $I_s$, as shown by the arrow, induces a counter-magnetic flux within the shielded cable 30 which opposes the magnetic flux induced by the lightning, thereby effectively protecting conductors 18 from the voltage surge.

At the end of the lightning-induced voltage surge, the high-impedance of network 32 is restored, and protection from electrostatic coupling into the signal wires 18 is maintained by the single-ended ground connection at 13, since the ground circuit becomes again open between end 22 of shield 20 and ground at 14.

A simple embodiment of network 32 consists of a pair of diodes 34 and 35 connected in parallel back-to-back. Depending on the polarity of the lightning-induced voltage surge in shield 20, either diode 34 or diode 35 will conduct, thus completing the shield-to-ground path for the lightning-induced shield current $I_s$. At the end of the lightning-induced voltage surge in shield 20, the high impedance of the conducting diode is re-established. Then, the only grounded end 21 of shield 20 will provide to conductors 18 protection from electrostatic noise interference.

While the diode network 32 is very practical as to size, weight, and cost, other solid-state or gas-filled components are commercially available which could very quickly change from very-high to very-low impedance under an impressed voltage surge, such as is induced by lightning.

Thus, in accordance with this invention, the shielded cable system 30 of this invention provides with a single shield the desired protection from electrostatic interference, as well as from electromagnetic interference produced by lightning.

What is claimed is:

1. A shielded cable system carrying one or more conductors enclosed by a conductive shield having one end connected to ground to provide protection from electrostatic interference, the improvement wherein, a passive protector network is connected between the other end of the shield and ground, said network normally having a very-high impedance and changing to a very-low impedance in response to a momentary voltage surge electromagnetically induced in the shield, thereby establishing a conductive circuit path between the shield and ground, and said surge voltage driving a shield current through said circuit to provide an electromagnetic field of the opposite direction cancelling and reducing the magnitude of the overall electromagnetic field that links the shielded cable thereby reducing the electromagnetically induced voltage in the shielded conductors and providing protection from the induced electromagnetic interference.

2. The shielded cable system according to claim 1, wherein, said network comprises a pair of diodes connected in parallel back-to-back, whereby a voltage surge of either polarity changes said network's very high impedance to a very-low impedance.

* * * * *

UNITED STATES PATENT OFFICE
CERTIFICATE OF CORRECTION

PATENT NO. : 4,264,940
DATED : April 28, 1981
INVENTOR(S) : Kent D. Castle

It is certified that error appears in the above-identified patent and that said Letters Patent are hereby corrected as shown below:

On The Title Page:

[54] As listed on patent - no change

[75] Inventor:   Kent D. Castle, League City, Texas

[73] Assignee:   The United States of America as Represented by the Administrator, National Aeronautics and Space Administration, Washington, DC Signed and Sealed this Twenty-second Day of September 1981

[SEAL]

Attest:

GERALD J. MOSSINGHOFF

Attesting Officer

Commissioner of Patents and Trademarks